United States Patent [19]
Cross

[11] Patent Number: 4,728,795
[45] Date of Patent: Mar. 1, 1988

[54] OPTICAL TARGET DETECTION SYSTEMS

[75] Inventor: Malcolm G. Cross, Colchester, United Kingdom

[73] Assignee: The Marconi Company Limited, Chelmsford, England

[21] Appl. No.: 84,469

[22] Filed: Oct. 16, 1979

[30] Foreign Application Priority Data

Oct. 18, 1978 [GB] United Kingdom ............... 40967/78

[51] Int. Cl.$^4$ ........................... G01J 1/00; G01J 1/20; G01B 11/26; G01C 1/00
[52] U.S. Cl. ................................ 250/347; 250/203 R; 250/342; 356/152
[58] Field of Search ............ 250/203 R, 203 CT, 342, 250/332, 334, 347, 351, 353; 356/141, 152

[56] References Cited

U.S. PATENT DOCUMENTS

| | | | |
|---|---|---|---|
| 3,353,022 | 11/1967 | Schwartz | 250/347 |
| 3,781,111 | 12/1973 | Fletcher et al. | 356/152 |
| 3,897,151 | 7/1975 | Lecroy | 356/141 |
| 4,068,124 | 1/1978 | Kleider | 250/332 |
| 4,193,689 | 3/1980 | Reymond et al. | 356/152 |

FOREIGN PATENT DOCUMENTS

| | | |
|---|---|---|
| 1177641 | 1/1970 | United Kingdom . |
| 1444518 | 8/1976 | United Kingdom . |
| 1459088 | 12/1976 | United Kingdom . |
| 1482789 | 8/1977 | United Kingdom . |

*Primary Examiner*—Stephen C. Buczinski
*Attorney, Agent, or Firm*—Spencer & Frank

[57] ABSTRACT

The invention provides an infra-red target detection system in which an array of infra-red detectors is scanned vertically in swathes and horizontal scanning is effected by sampling the output of each detector in turn. Addresses of target detections in the vertical and horizontal are stored and read out into an X and Y co-ordinate target position store if a detection resulting from scanning in the vertical corresponds to a detection resulting from scanning in the horizontal.

11 Claims, 5 Drawing Figures

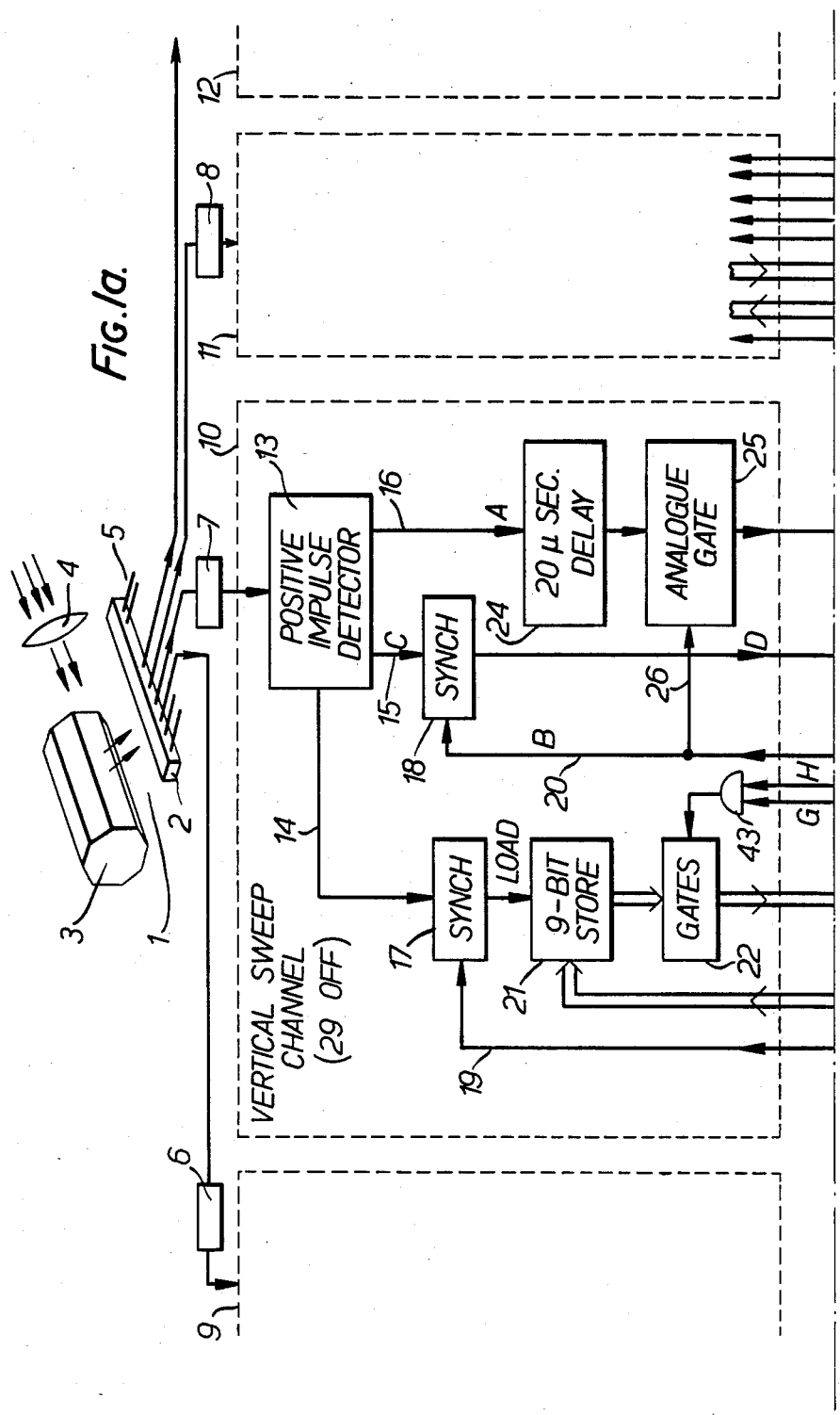

OPTICAL TARGET DETECTION SYSTEMS

BACKGROUND AND SUMMARY OF THE INVENTION

This invention relates to optical target detection systems and in particular to infra-red optical detection systems.

The invention seeks to provide improved such systems.

According to this invention, an optical target detection system comprises means for causing an array of optical detectors to scan across a field of view in swathes in one co-ordinate direction, means for scanning said field of view in another co-ordinate direction, means for producing target responses resulting from scanning in said one co-ordinate direction, means for generating an address code related to the position in said one co-ordinate direction at which a detection occurs, first storage means for storing said address code, means for producing target responses resulting from scanning in the other co-ordinate direction, means for generating an address code related to the position in said other co-ordinate direction at which a detection occurs, second storage means for storing said last mentioned address code and means for reading out said first and second stores if a detection resulting from said scanning in said one co-ordinate direction corresponds to a detection resulting from said scanning in said other co-ordinate direction.

Preferably said system is an infra-red target detection system, said detectors being infra-red detectors.

Preferably said means for scanning said field of view in said other co-ordinate direction comprises means for sequentially sampling the outputs of the detector elements in said array in synchronism with said scanning in said one co-ordinate direction.

Preferably said one co-ordinate direction is the vertical and said other co-ordinate direction is the horizontal.

Preferably a third store is provided to store the first and last mentioned address codes of a target when said first and second storage means are read out.

Preferably for each of the detector elements in said array an individual processing channel is provided for processing target detectors occurring during scanning of that detector in its swathe in said one co-ordinate direction, each of said last mentioned channels comprising an individual address store for storing code words related to the position in which in said one co-ordinate direction the respective individual detector element detects a target, said last mentioned individual store forming part of said first storage means, gating means for controlling the reading out of said individual stores, a pulse detector connected to the output of said individual detector element and arranged to provide an output indicative of the instant of target detection by said individual detector element, which output is connected to control the loading of said individual store with an address code, a pulse output indicative of a target detection and an analogue waveform output corresponding to the input of said individual pulse detector, all of said last mentioned outputs from said individual pulse detector being synchronised to the corresponding outputs of the individual processing channels provided in respect of the other individual detector elements of the array.

Preferably a common processing channel is provided for processing target responses resulting from scanning in said other co-ordinate direction and last mentioned processing channel including a further pulse detector to which the combined analogue waveform outputs of all of said individual processing channels for target responses resulting from scanning in said one co-ordinate direction are applied in combination (preferably via a low pulse filter arrangement) and said last mentioned pulse detector providing two synchronised outputs the first of which relates to the instant at which a pulse is detected and the other of which comprising a control pulse generated upon target detection, said last mentioned pulse being arranged to be gated under the control of the corresponding pulses generated by the pulse detectors in the processing channels provided to process target responses resulting from scanning in said one direction whereby said control pulse output is only provided if a detection resulting from said scanning in said one co-ordinate direction corresponds to a detection resulting from said scanning in said other co-ordinate direction, means for utilising said signal representing the instant of detection for loading said second storage means consisting of a common address store and means for utilising said output control pulse to control the transfer of address codes stored in said first and second stores to said third store.

Typically the number of detector elements in said array is twenty-nine, said address code relating to the position in said one co-ordinate direction at which a detection occurs is a nine-bit code word and said address code related to the position in said other co-ordinate direction at which a detection occurs is a seven-bit code word.

BRIEF DESCRIPTION OF THE DRAWINGS

The invention is illustrated in and further described with reference to the accompanying drawings in which.

DETAILED DESCRIPTION OF THE PREFERRED EMBODIMENT

Figure 1B:
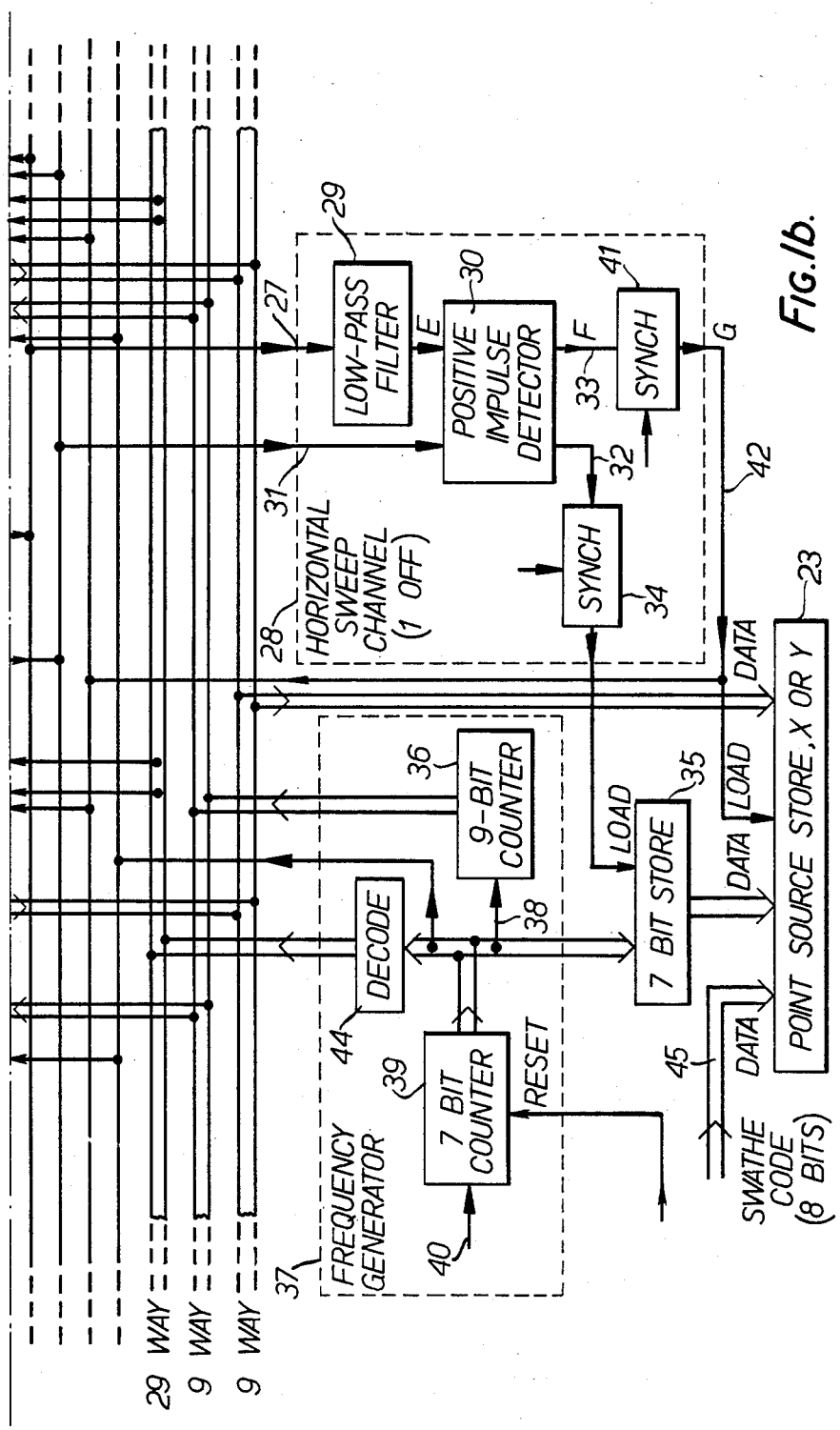
FIG. 1 is a block schematic diagram of one target detection system in accordance with the present invention.

Referring to FIG. 1 an infra-red scanning sensor is represented in highly schematic form at 1. Sensor 1 consists of a horizontal array 2 of twenty-nine square infra-red detector elements which are scanned together vertically in space by a cylinder 3 of octagonal cross-section having plane mirrors on its eight sided face. Provided to focus energy from the field of view onto the rotating cylinder 3 is an infra-red lens 4 so that any infra-red energy incident upon the lens 4, and within the field of view, is reflected from one of the plane mirrors on the cylinder 3 onto the detector array 2.

Thus the rotating cylinder 3 causes each of the detectors in the array 2 to sweep across the field of view in vertical sweeps. In this particular example, the extent of a vertical sweep is 10°. The angular field of view of any one of the detectors in array 2 is one milliradian in both horizontal and vertical extent, so that a single vertical sweep examines a swathe 29 milliradians in azimuth and 10° in elevation.

Detector array 2 has twenty-nine outputs represented at 5, each connected to a different one of the detector elements in array 2. Each output lead is connected via an individual one of twenty-nine pre-amplifiers (of which three are represented referenced 6, 7 and 8) to the input of an individual one of twenty-nine vertical sweep channels of which four, are represented as dashed line blocks referenced 9, 10, 11 and 12. Of the twenty-nine vertical sweep channels only vertical sweep channel 10 is shown in any detail. It should be understood that each vertical sweep channel is identical in content.

Figure 2:
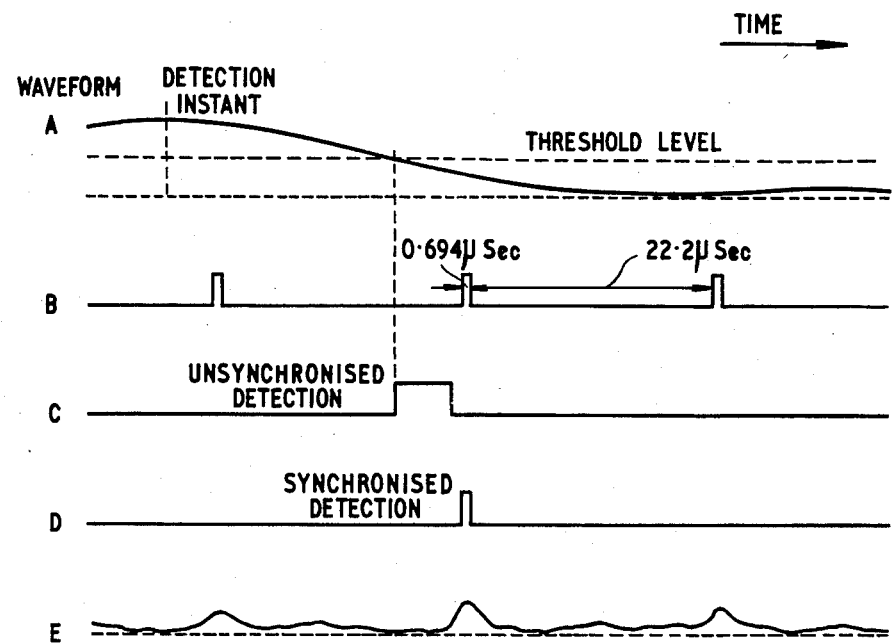
FIG. 2 shows a series of explanatory waveform diagram relating to the embodiment of FIG. 1.
Figure 2:
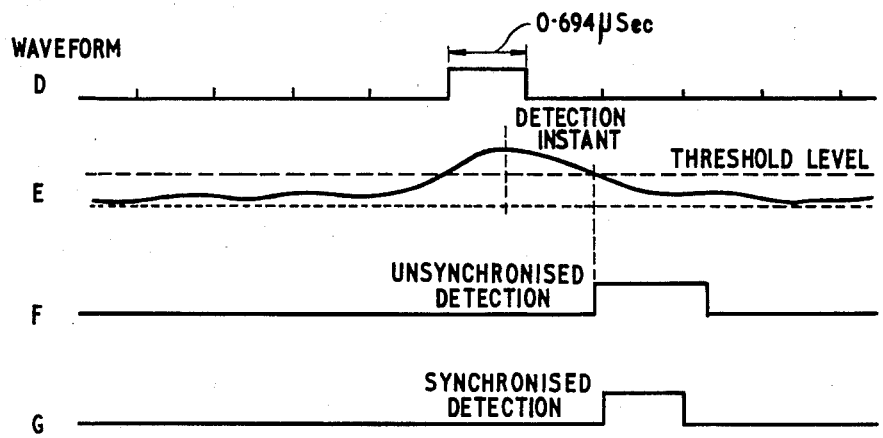
Figure 4:
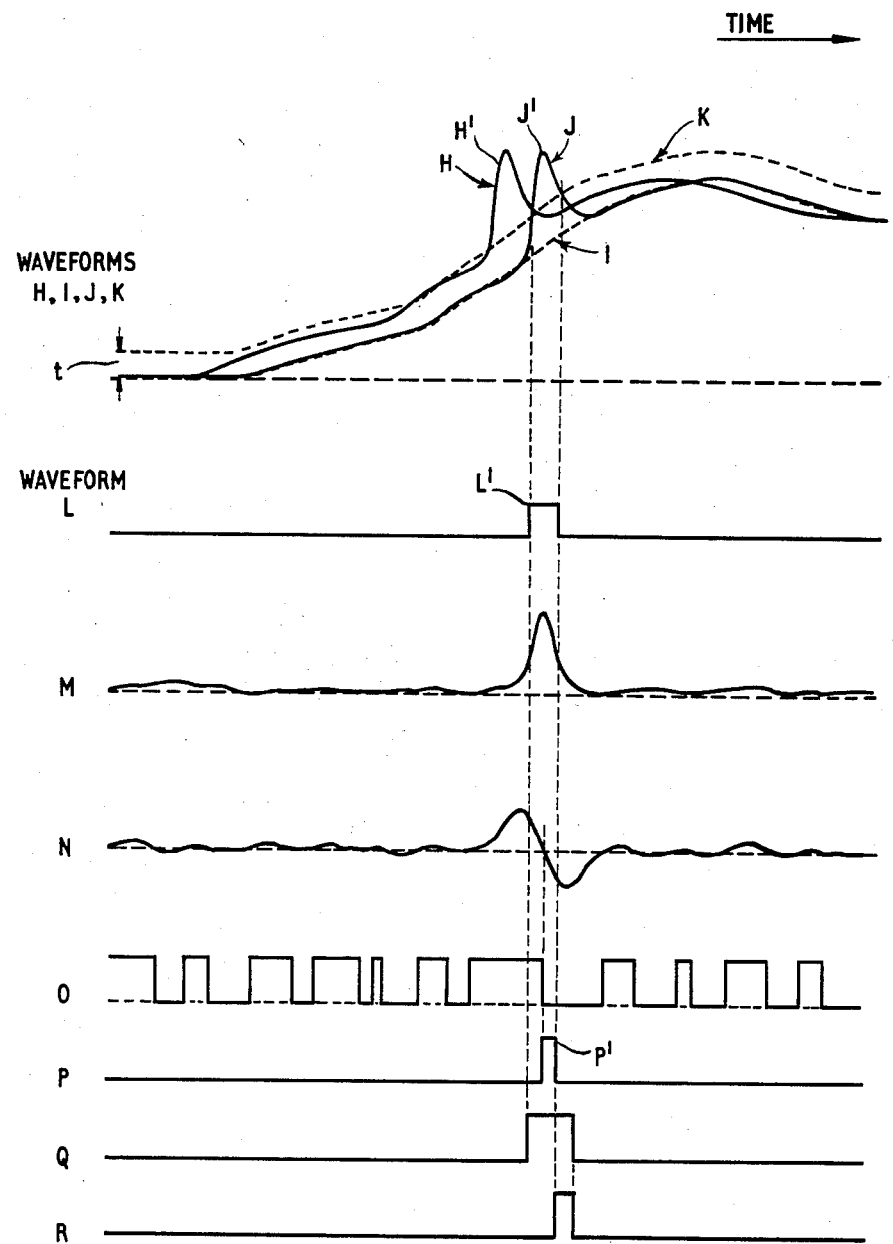
FIG. 4 shows a number of explanatory waveforms relating to the positive impulse detector of FIG. 3.

The content of vertical sweep channel 10 will now be described in detail. The input vertical sweep channel 10 received via pre-amplifier 7 is applied to a positive impulse detector 13. Positive impulse detector 13 has three output leads referenced 14, 15 and 16 respectively. Output lead 14 corresponds to output terminal 16' in accompanying FIG. 3. Output lead 15 corresponds to output terminal 15' of accompanying FIG. 3 and output lead 16 corresponds to output terminal 17' of accompanying FIG. 3. For a detailed explanation of the operation of positive impulse detector 13 reference may be made to the accompanying FIG. 3 and the description relating thereto. However, the outputs provided in response to an impulse applied to it via pre-amplifier 7 may be summarised as:

(a) on output lead 14, a pulse edge denoting a "detection instant" (that is to say the instant of the signal waveform peak amplitude) with the detection instant being shown in waveform A of FIG. 2, and the pulse being illustrated in waveform P of the accompanying FIG. 4;

(b) on output lead 15, a pulse denoting the existence of a positive impulse as illustrated in waveform C in FIG. 2; and (c) on output lead 16, the analogue signal waveform filtered with low frequencies (which contain most of the clutter energy) attenuated, as shown at A in FIG. 2.

For further processing the pulses appearing on output lead 14 and 15 are synchronised in synchronising circuits 17 and 18 respectively with the system clocks (not shown) which are themselves synchronised to the system master clock which controls the scanner encoder (also not shown). The synchronising circuits 17 and 18, as with other synchronising circuits hereinafter to be mentioned, are not shown in detail but in practice consist of a simple J-K flip-flop with inverter requiring a suitable synchronised clock input. The required clock input for synchronising circuit 17 is a train of clock pulses applied via lead 19. The required clock input in the case of scanning circuit 18 is a train of clock pulses as shown in waveform B in FIG. 2 applied to lead 20.

Waveform D of FIG. 2 shows the pulse of waveform C of FIG. 2 appearing on output lead 15 after synchronising in synchronising circuit 18.

As the rotating cylinder 3 effects vertical scanning, a 9-bit elevation address code sequence is generated by means of a synchronised 9-bit counter 36 within a frequency generating circuit 37 so that at any instant the 9-bit code generated indicates the instantaneous elevation. Synchronising signals for counter 36 are applied via lead 38. The 9-bit elevation address is applied to a store 21, which is connected to be controlled or loaded by the output of synchronising circuit 17. Thus when positive impulse detector 13 provides an ouptut on lead 14 which shows the instant of a detection, store 21 is loaded and caused to hold the elevation address of the detection.

The output of store 21 is connected via gates represented by block 22 which are opened (i.e. rendered conductive) to pass the stored elevation address to a point source store (X or Y) 23 if, but only if, detection of the same source is confirmed in azimuth (as hereinafter to be described). Typically point source store 23 provides one thousand and twenty-four locations of twenty-four bit words.

The filtered analogue waveform A of FIG. 2 appearing on output lead 16 of positive impulse detector 13 is applied via a delay circuit 24 to the input of an analogue gate 25 which latter is controlled to be opened by a clock signal appearing on control lead 26. Lead 26 is connected to lead 20 so that this last mentioned clock signal is the smae as the synchronising clock signal applied to synchronising circuit 18.

Gate 25 is opened sequentially and in turn with the corresponding gates in the other twenty-nine vertical sweep channels so that the filtered signal waveform A of FIG. 2 is sampled sequentially in order of channels so as to create the effect of a horizontal sweep. In this example each of the gates corresponding to gate 25 is opened to take samples at 22.2 $\mu$ second intervals and for periods of 0.694 $\mu$ seconds (see waveform B of FIG. 2). The delay provided by delay circuit 24 is of approximately 20 $\mu$ seconds duration so that the azimuth samples taken at synchronised instants (waveform D of FIG. 2) are taken near the peak of the analogue waveform (A of FIG. 2) delayed).

The output of each of the gates corresponding to gate 25 is connected to the input lead 27 of a common horizontal sweep channel 28. Input lead 27 is connected to a low-pass filter 29, so that the commutated twenty-nine elevation channel samples are combined and smoothed to produce the waveform E of FIG. 2.

The output of filter 29 is connected to the input of a positive impulse detector 30. Detector 30 is again as described with reference to accompanying FIG. 3 except in two respects, these being that a filtered analogue output waveform is not required and that therefore no output lead is provided which corresponds to output terminal 17' of accompanying FIG. 3 and that a control input 31 is provided which is connected to the outputs of all of the synchronising circuits corresponding to synchronising circuit 18 (FIG. 1) of the twenty-nine vertical sweep channels 9, 10, 11, 12 etc.

Figure 3:
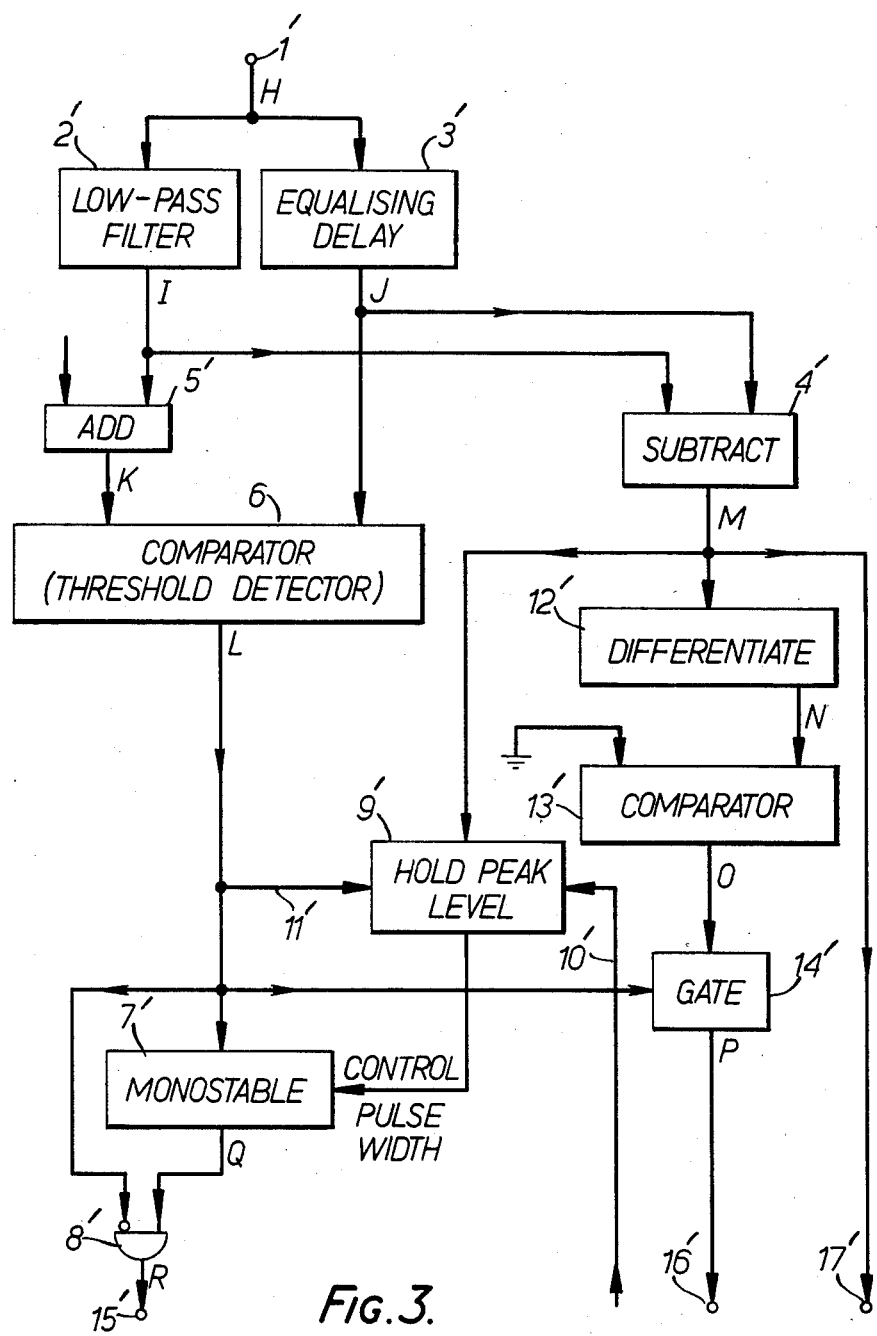
FIG. 3 is a block schematic diagram of a positive impulse detector used in FIG. 1.

Output lead 32 of positive impulse detector 30 corresponds to output terminal 16' of accompanying FIG. 3 and output lead 33 of positive impulse detector 30 corresponds to output terminal 15' of accompanying FIG. 3.

The outputs provided in response to an impluse appearing at the input to positive impulse detector 30 may be summarised as follows:

(a) on output lead 32, a pulse edge denoting a "detection instant" (that is to say the instant of the signal waveform peak amplitude); and (b) on output lead 33, a pulse denoting the existence of a positive impulse as illustrated in waveform F of FIG. 2.

The output on lead 33 is however conditional upon the signal being narrow also in the vertical. This is achieved by means of the control signal available on input lead 31, which as previously described, is connected via the synchronising circuits corresponding to synchronising circuit 18 to the outputs corresponding to output 15 of the positive impulse detectors corresponding to detector 13 provided in each of the twenty-nine vertical sweep channels 9, 10, 11, 12 etc. Whilst not represented, the output lead 33 within positive impulse detector 30 includes a gate which is arranged to be controlled by the control signal appearing on lead 31.

Output lead 32 is connected via a synchronising circuit 34 to control the loading of a 7-bit store 35 with a 7-bit horizontal address generated by a 7-bit counter 39 within frequency generator 37. Counter 39 is synchronised by signals applied via lead 40 so that at any instant the 7-bit address generated indicates the position attained in the effective horizontal sweep i.e., which of the gates corresponding to gate 25 is open. Counter 39 is arranged to be reset at the beginning of each vertical scan by a signal applied to it from a scanning encoder (not shown) provided to control vertical and horizontal scanning as hereinbefore mentioned.

The output lead 33 is applied via synchronising circuit 41 to a control lead 42. The synchronised signal appearing on lead 42 is as shown at G in FIG. 2.

This, it will be recalled, represents that a signal has been detected which is narrow in azimuth and elevation. Lead 42 is connected to control the loading of point source store 23 with the azimuth address stored in 7-bit store 35 and to control the opening (i.e. the rendering conductive) of the respective one of the gates corresponding to gate 22 in the vertical sweep channels 9, 10, 11 and 12 etc. It will be noted that the control path to the gate 22 is via an AND gate 42. Corresponding AND gates are provided in the other vertical sweep channels. Each of the AND gates has one input to which control lead 42 is connected and a second input to which an individual clock output from a twenty-nine output decoder 44 in frequency generator circuit 37 is connected. Decoder 44 derives an input from 7-bit counter 39 and thus the AND gates corresponding to AND gate 43 are prepared to be opened sequentially and in turn and in synchronism with the vertical scanning, and are opened at the appropriate time if a control pulse also appears on control lead 42.

With the appropriate gate corresponding to gate 22 opened, the vertical address stored in 9-bit store 21 is also loaded into point source store 23.

The clock pulses applied to the AND gates corresponding to AND gate 43 are of the same width as the synchronising pulses applied to the synchronising circuits such as synchronising circuit 18 but differ in time by two pulse widths in order to compensate for the delay in the detection process of positive impulse detector 30. This delay is shown in FIG. 2 as the delay between waveform D, which (as has been described) occurs simultaneously with one of the pulses on leads 20–26, and waveform G which occurs two pulse widths later.

Also entered into store 23 is an 8-bit code derived from the scanner encoder (not shown) via path 45 and identifying the swathe number.

The arrangement described above works in real time and is capable of handling target of a wide distribution in time and space, an assumption being made that a second positive waveform peak shall not occur above threshold within too short a time after the first peak. This is reasonable however since the short times involved may be of the order of the order of the resolution of the system.

In a practical case the timing and synchronising signals are provided from a 5.77 MHz clock oscillator which is synchronised to the scanner encoder. Ideally the scanner encoder itself would be used to generate pulses at a 5.77 MHz rate (128 times vertical resolution bit-rate) but this could involve practical difficulties and thus the scanner encoder is designed to operate at the fastest practical pulse rate and its output utilised to synchronise a separate 5.77 MHz clock oscillator.

As illustrated, waveform G of FIG. 2 and the waveform of input H are identical. However, in order to allow for all possible relative timings of detection instants relative to pulses such as waveform D, and for all target amplitudes (which affects the time above threshold in waveform E), it may be desirable to arrange a third input to AND gate 43 similar and adjacent to input H, since waveform G may occur not only delayed by two pulse widths on waveform D, but also it may be three pulse widths delayed.

The arrangement, shown in FIG. 3, is provided to detect positive going impulses in a signal such as might be produced from an infra-red detector. The signal is applied, after pre-ampification and noise bandwidth limiting to an input terminal 1'. At this point the waveform is as illustrated at H in FIG. 4, where a positive going impulse is shown at H'.

Input terminal 1' is connected to pass the waveform H, in parallel, through a low pass filter network 2 and an equalising delay network 3', the latter providing a delay equivalent to the delay of the low pass filter 2.

Since both networks 2' and 3' are third order, each may consist, in practice, of an operational amplifier, a transistor, three capacitors and several resistors.

The output signal of low pass filter 2' is the waveform I of FIG. 4, whilst the output signal of the equalising delay network 3' is the waveform J of FIG. 4, with the positive going impulse still present and hereshown at J'. The outputs of the networks 2' and 3' are applied to a subtractor circuit 4' which subtrates the waveforms I and J of FIG. 4 to provide at the output of subtractor circuit 4' the waveform shown at M in FIG. 4.

The output signal of low pass filter network 2', the waveform I, is added in an adding circuit 5' to a threshold level, t in FIG. 4, to provide at its output the waveform K.

The output signal of adding circuits 5', the waveform K, is applied to a comparator or treshold detector 6', a second input for which is provided with the output signal of the equalising delay network 3', i.e. the waveform J. The output signal of comparator 6' is thus the waveform L of FIG. 4.

The output signal of comparator 6', the waveform L, is applied to trigger, with the leading edge of the pulse L' in waveform L, a monostable circuit 7'. Monostable circuit 7' provides an output signal as shown at Q in FIG. 4 and this output signal is applied with the output signal from the comparator 6' (i.e. the waveform L) to a logic gate 8' so that the pulse provided by the monostable 7' is compared in width with the pulse L' provided in the output waveform L of the comparator 6'. If the pulse L' is of a width greater than that of the pulse of the monostable 7' no output will be obtained from the logic gate 8', but if the pulse L' is narrower than the pulse of the monostable circuit 7', an output signal will appear as shown at R in FIG. 4.

Large point source infra-red targets can result in waveforms (L) at the output of the comparator 6', which have pulses (L') of several resolution widths and these would not normally result in an output pulse at the output of logic gate 8'. In order to accommodate such very large point source targets, the output waveforms I and J of the low pass filter network 2' and the equalising target network 3' are applied to a subtractor circuit 4' which produces at its output the difference as shown at M in FIG. 4. The output waveform M of subtractor circuit 4' is applied to a peak level holding circuit 9', which holds the peak level of the waveform M, if a threshold level has been exceeded. The output of the peak level holding circuit 9' is applied to the monostable circuit 7' to control the width of the pulse produced by this monostable circuit in accordance with a control law such that for target sources of interest the output pulse of the monostable 7' exceeds the width of the pulse L' in the waveform L at the output of the comparator circuit 6' thus ensuring an output pulse from logic gate 8'. In practice, the control law will be an approximate square root log law. The output level holding circuit 9' is re-set as required by a pulse applied to "re-set to zero" input 10'. Peak level holding circuit 9' is primed to hold the peak level of the waveform M by a pulse upon "start" input 11'. As shown input 11' is connected to the output of comparator 6' so that peak level holding circuit 9' is primed by the leading edge of the pulse L' in the waveform L at the output of comparator circuit 6'.

In order to determine the precise instant of detection the output waveform M of the subtractor circuit 4' is applied to a differentiating circuit 12' which, from the waveform M, produces the waveform shown at N in FIG. 4.

The output signal of differentiating circuit 12', the waveform N, is applied to a comparator circuit 13' having a second input at common potential in order to record the zero crossings of the waveform N as shown by the waveform O in FIG. 4. The waveform O appearing at the output of the comparator circuit 13' is applied to a gate 14', which is arranged to be opened (i.e. rendered conductive) by the leading edge of pulse L' appearing in the waveform L at the output of the comparator circuit 6'. This produces at the output of the gate 14', the waveform P of FIG. 4, the leading edge of the pulse P' therein indicating the instant of detection.

Thus at output terminal 15' connected to the output of logic gate 8' will appear a pulse denoting the presence of an impulse signal, whilst at output terminal 16' connected to the output of gate 14' will appear a pulse, the leading edge of which represents the detection instant. A further output terminal 17' is connected to the output of subtracting circuit 4' in order to provide a high frequency analogue output (the waveform M) where this is required.

I claim:

1. An optical target detection system comprising means for causing a linear array of optical detectors to scan in one coordinate direction across a field of view in swathes extending in said one coordinate direction with said detectors being arranged so that each scans a different part of a swath, means connected to said detectors for scanning said field of view during each of said swath in another coordinate direction, first means for evaluating the output signal from said detectors and for producing signals representing target responses resulting from said scanning in said one coordinate direction, first storage means for storing a digital address code related to the position in said one coordinate direction at which a target response signal occurs, second means for evaluating the output signals from said detectors and for producing signals representing target responses resulting from said scanning in the other coordinate direction, second storage means for storing a digital address code related to the position in said other coordinate direction at which a target response signal occurs, and means for reading out and utilizing the content of said first and second storage means only if target response signals result from said scanning in both said coordinate directions from the same position in said field of view.

2. A system as claimed in claim 1 wherein said detectors are infra-red detectors.

3. A system as claimed in claim 1 wherein said means for scanning said field of view in said other co-ordinate direction comprises means for sequentially sampling the outputs of the detector elements in said array in synchronism with said scanning in said one co-ordinate direction.

4. A system as claimed in claim 1 wherein said one co-ordinate direction is the vertical and said other co-ordinate direction is the horizontal.

5. A system as claimed in claim 1 or 3 wherein a third store is provided to store the two said address codes relating to a target when said first and second storage means are read out.

6. A system as claimed in claim 1 or 3 wherein for each of the detector elements in said array an individual processing channel is provided for processing target response signals occurring during scanning of that detector in its swathe in said one co-ordinate direction, each of said last mentioned channels comprising an individual address store for storing words related to the position in which in said one co-ordinate direction the respective individual detector element detects a target, said last mentioned individual store forming part of said first storage means, gating means for controlling the reading out of said individual stores, and a pulse detector connected to the output of said individual detector element and arranged to provide an output indicative of the instant of target detection by said individual detector element, which output is connected to control the loading of said individual store with an address code, a pulse output indicative of a target detection and an analogue waveform output corresponding to the input of said individual pulse detector, all of said last mentioned outputs from said individual pulse detector being synchronised to the corresponding outputs of the individual processing channels provided in respect of the other individual detector elements of the array.

7. A system as claimed in claim 6 wherein a common processing channel is provided for processing target responses resulting from scanning in said other co-ordinate direction, said lastmentioned processing channel including a further pulse detector to which the combined analogue waveform outputs of all of said individual processing channels for target response signals resulting from scanning in said one co-ordinate direction are applied in combination and said lastmentioned pulse detector providing two synchronised outputs, the first of which relates to the instant at which a pulse is detected and the other of which comprising a control pulse generated upon target detection, said lastmentioned pulse being arranged to be gated under the control of the corresponding pulses generated by the pulse detectors in the processing channels provided to process target responses resulting from scanning in said one directon whereby said control pulse output is only provided if a detection resulting from said scanning in said one co-ordinate direction corresponds to a detection resulting from said scanning in said other co-ordinate direction, means for utilising said signal representing the instant of detection for loading said second storage means consisting of a common address store and means for utilising said output control pulse to control the transfer of address codes stored in said first and second stores to said third store.

8. A system as claimed in claim 7 wherein said combined analogue waveform outputs are applied to said further pass detector via a low pulse filter arrangement.

9. A system as claimed in claim 1 wherein the number of detector elements in said array is twenty-nine, said address code relating to the position in said one co-ordinate direction at which a target response occurs is a 9-bit code word and said address code related to the position in said other co-ordinate direction at which a response signal occurs is a 7-bit code word.

10. A system as claimed in claim 3 wherein; said array is a linear array; said means for producing signals representing target responses from scanning in said one co-ordinate direction includes a separate signal processing channel for each detector of said array; said means for producing signals representing target responses from scanning in the other co-ordinate direction includes a further common signal processing channel connected to the output of said means for sequentially sampling; and each of said signal processing channels includes a separate pulse detecting means for evaluating the input signal thereto from the associated one of said detectors to produce said signals representing target responses.

11. An optical target detection system comprising a linear array of optical detectors each arranged to receive radiation from parts of a field of view spaced in an x coordinate direction; scanning means for causing said array to scan the field of view in swaths, each swath extending in a y direction which is transverse to said x direction; first target detecting means for detecting a variation in the output signals of said optical detectors during said scanning, which variation is characteristic of the existence of a target; second target detecting means connected to receive the output signals of the detectors of said array during said scanning and for detecting differences in said output signals of said detectors of said array which differences are characteristic of the existence of a target; and output means for producing an output signal in response to detection, by both said first and second target detecting means, of a target at the same instantaneous field of view along a swath.

* * * * *